Feb. 2, 1943.    C. C. DRUMMOND    2,309,941
WARNING SIGNAL DEVICE
Filed Feb. 17, 1940    2 Sheets-Sheet 1

INVENTOR
Carlton C. Drummond
BY
Barlow & Barlow
ATTORNEYS.

Feb. 2, 1943.    C. C. DRUMMOND    2,309,941
WARNING SIGNAL DEVICE
Filed Feb. 17, 1940    2 Sheets-Sheet 2

INVENTOR.
Carlton C. Drummond
BY Barlow & Barlow
ATTORNEYS.

Patented Feb. 2, 1943

2,309,941

UNITED STATES PATENT OFFICE 2,309,941

WARNING SIGNAL DEVICE

Carlton C. Drummond, Providence, R. I.

Application February 17, 1940, Serial No. 319,382

1 Claim. (Cl. 116—129)

This invention relates to warning signal devices, and has for one of its objects the provision of a signalling device having means whereby the different operating conditions to be indicated will be read in colors.

Another object of the invention is to provide an arrangement of a plurality of different indicating mechanisms whereby the independent results of the separate mechanisms coact to form one single indicating instrumentality.

Another object of the invention is to provide an arrangement of a plurality of different indicating mechanisms whereby the independent results of the separate mechanisms will appear in the same color and coact to form one substantially continuous single indicating instrumentality of rectilinear form having an apparent combined length of all the individual colored indications to create a single impression of that color to the eye of an observer whereby any interruption in the apparent continuity of such combination of that color by a different color will be instantly discernible and act as a visual warning that either a predetermined or an abnormal operating condition exists.

Another object of the invention is to provide a signal device to the operator of an automotive vehicle so constructed and located that the driver will be compelled to take notice of the indicated conditions so that it will not be necessary for him to divert his attention from the road to watch the various instruments.

Another object of the invention is to provide visual means for keeping the operator informed at all times of the working conditions of an entire machine and to provide an automatic warning to the operator when abnormal conditions occur in the operation of the machine.

A further object of the invention is to provide a sound signal to the operator of an automotive vehicle to automatically warn him when an abnormal indicating condition exists in any instrument reading or a pre-determined limit of operation is reached or exceeded.

With these and other objects in view, the invention consists of certain novel features of construction as will be more fully described and particularly pointed out in the appended claim.

This invention can be applied to automobiles, airplanes, boats, radio station and power plant control boards and the like, but since its use in automobiles is typical, the descriptions hereinafter to follow will relate to its application to an automotive vehicle.

Figure 2:
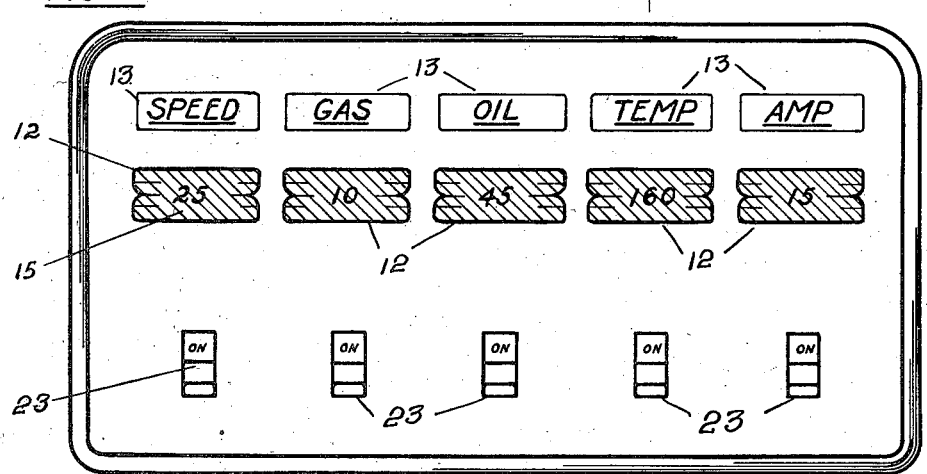
Fig. 2 is an enlarged front elevational view of the panel showing the relative position of the indicating instruments and slot openings or windows through which the indicating readings of the instruments are read.
Figure 3:
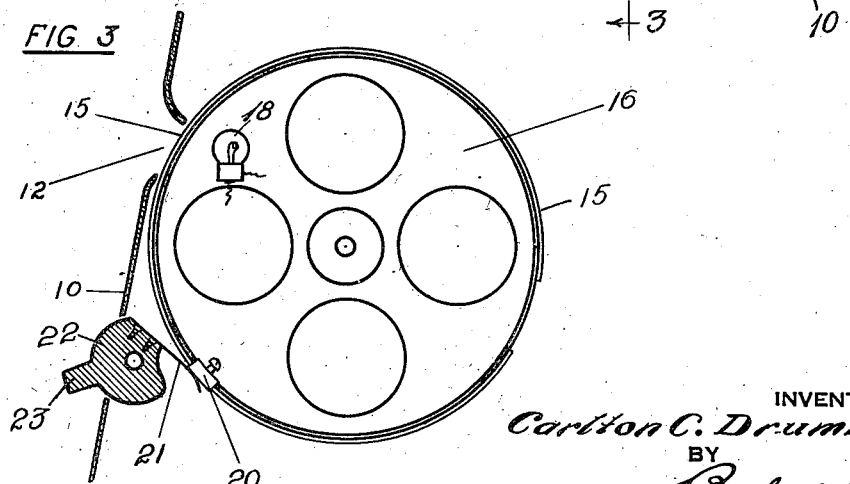
Fig. 3 is a vertical sectional view of the instrument panel taken on the line 3—3 of Fig. 2 showing the relative arrangement of the slot opening, the warning buzzer switch, and the translucent indicating strip affixed to the circumference of an indicating drum.
Figure 4:
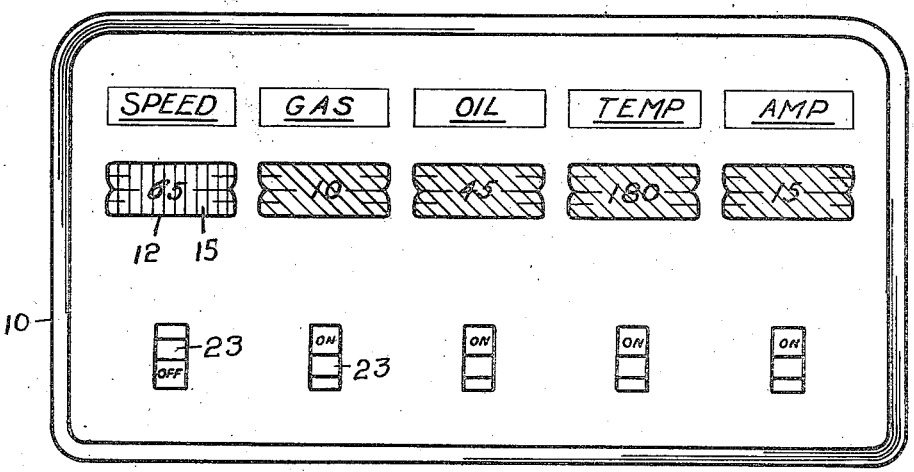
Fig. 4 is a front view of the instrument panel shown in Fig. 2 when the automobile is travelling at high speed, in which the speedometer reading appears on a solid red background, and with the buzzer switch being shown in an off-position to eliminate annoyance.

In the conventional motor car the usual instruments for indicating speed, engine temperature, oil pressure, gasoline and amperage are read separately by the operator of the vehicle so that whenever he wishes to know the working condition of the entire car it is necessary for him to divert his attention from the road for several seconds and watch each instrument individually and then decide whether the indicated reading of the particular instrument under observation represents a normal or critical condition before looking at the indicated reading of the next instrument. This operation, of course, constitutes an accident hazard since the driver should be paying attention to the business of driving; and in order to overcome the aforementioned difficulties the present invention contemplates a construction in which the various indicating instruments, such as the speed-responsive mechanism, ammeter, engine temperature indicator, fuel gauge and oil gauge, are so arranged that the individual indicating readings of the respective instruments will appear through slots or window in a perforated, generally opaque, panel with the slots arranged in a horizontal line very close together; and each of the indicating members on whose face the indicating readings appear comprise a strip of colored paper or some translucent material which is arranged to move up and down behind the slots allowing only that portion of the strip which denotes the prevailing operating conditions to show through the slot when viewed from the front of the panel; and to more readily compel the attention of the driver to the readings, the scale is provided with numeral-bearing sections of graduated colors which are conventional red, yellow and green used in connection with traffic signals, which colored portions, however, do not end abruptly on the scale, but rather blend themselves together in a somewhat rainbow fashion lengthwise of the scale; and some suitable audible signal device is provided capable of selective control which will supplement the visible signal to readily attract the attention of the driver when a pre-determined operating condition of the vehicle is exceeded or an abnormal condition occurs; and the following is a more detailed description of the present embodiment of this invention, illustrating the preferred means by which these advantageous results may be accomplished:

With reference to the drawings, 10 generally designates an instrument panel made of some suitable opaque material, such as sheet metal or of some plastic resinoid molding composition, having a plurality of slots or elongated window openings 12 arranged in a row, as shown in Figs. 2 and 4 so as to form a horizontal line and appear, when viewed from the front of the panel, as a continuous band except for the narrow dividing strip of the panel material separating the adjacent slots. Suitable legends 13 may be placed over each of the slots 12 to designate the character of the reading to be indicated at a particular slot.

Disposed at the back of the panel behind each of the slots 12 is located the movable scales 15 actuated by and mounted in any suitable manner on the rotatable drums 16 of the individual indicating mechanisms which are especially designed to function for indicating the desired operating conditions to be observed, such as, for example, the speed-responsive mechanism, fuel gauge, oil gauge, temperature indicator and ammeter, all of which mechanisms may be of any ordinary construction (not shown) and require no specific description since "per se" they form no part of the present invention.

The scales 15 are of similar construction except as to the specific markings and numerals, and preferably are formed of some translucent material printed with suitable graduations and numerals of some material opaque to light, whereby the readings of those portions of the scales which become progressively exposed to view through the individual openings 12 will be readily visible upon illumination in a suitable manner, as by the passage of light through the scale from a suitable light source 18, such as an electric light located behind the scale and connected into the lighting circuit of the vehicle. It will be obvious that in lieu of the rearward illumination of the scales that direct or indirect lighting thereof may be employed to illuminate the front face of the scales, in accordance with known methods in the art.

Figure 5:
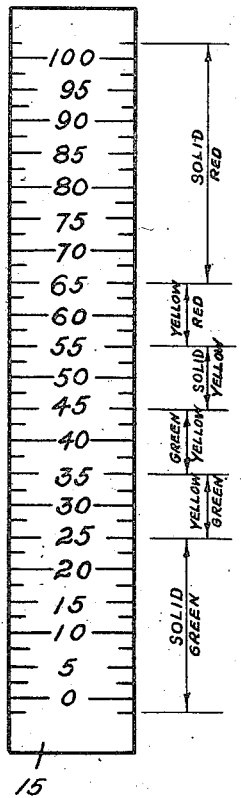
Fig. 5 shows a speedometer scale in a strip form before being mounted on the drum, showing sections of the scale provided with backgrounds of different colors.
Figure 6:
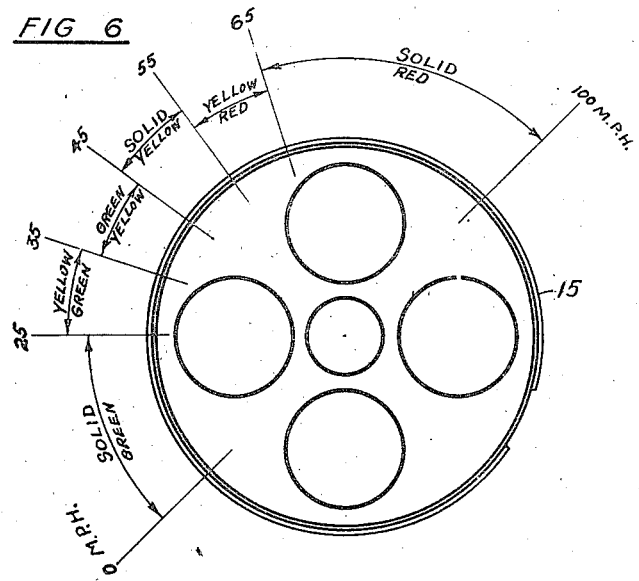
Fig. 6 is a side elevational view of the speed indicating strip shown in Fig. 5 when applied to a drum.

As indicated in Figs. 5 and 6, the face of the speedometer scale 15 is provided with a series of transverse graduation markings along the longitudinal side edges of the scale and designated by a centrally disposed row of numerals, preferably "0" to "100." The first set of numerals "0" to "25" designates a section of the scale having numerals printed or stenciled upon a background or field of solid green for indicating the low speed readings. The second set of numerals "25" to "35" will have a field of yellow-green shade, the numerals of the next higher speed range of from "35" to "45" will be placed on a background of green-yellow shade, while the numerals of the subsequent higher speed zones of "45" to "55" to "65" will be placed on a background of solid yellow and yellow-red, respectively, with a solid red background being employed for all numerals designating speeds of "65" and greater.

In a like manner the low, intermediate and high readings of the respective scales 15 of the fuel gauge, oil gauge, temperature indicator, and ammeter will be provided with similar colored sections denoting the readings in green or in shades of green when normal operating conditions indicated by such instruments exist and showing other sections in red, yellow or in yellow-red whenever abnormal operating conditions appear or when a predetermined maximum limiting condition is being exceeded.

Figure 1:
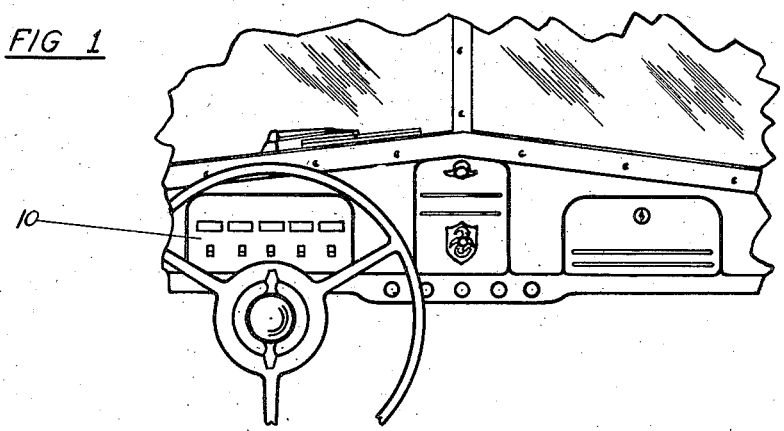
Fig. 1 is a front view of part of an automobile dashboard showing the preferred position of a signal device embodying the present invention and applied to an instrument panel.

The instrument panel 10 is preferably located, as shown in Fig. 1, on the dashboard of the automobile immediately in front of the driver so that it will attract his attention without any effort on his part.

To attract the attention of the driver and automatically warn him that certain pre-determined maximum conditions of operation of the machine have been reached, a buzzer (not shown) is provided to supplement the visionary function of one or more of the indicating instruments. For example, in the instance of the speedometer or speed-responsive mechanism, an electrical contact member 20 may be adjustably positioned on the drum 16 in proximity to its periphery to engage an electrical contact finger 21 mounted on a pivotal support member 22 and grounded on the vehicle frame to complete the electrical circuit to a buzzer when the drum 16 rotates about its axis through an angle sufficient to effect such engagement upon the showing of a colored section of the speed-indicating scale 15 designating abnormal speed, such as the portions having a field of yellow-red, or solid red. Thus, when a driver's mind is preoccupied and his speed of driving reaches the maximum limit allowed by law for city driving, a warning sound by the buzzer notifies him and he will "ease off" on the "gas" until his driving speed drops back within the legal limit. Should the driver choose to operate without the annoyance of the buzzer, as when driving on state highways at high speeds, such as 65 mi./hr. and greater, the contact finger 21 may be rocked into an inoperative position out of the path of the contact 20 by flipping up the finger piece 23 of the support 22, as indicated in Fig. 4. The contact 20 can be set to actuate the buzzer at any desired instrument reading.

The operation of the device is as follows: When the car is operating under normal conditions on the state highways at perhaps 25 M. P. H. with the ammeter showing a 15 ampere charging rate, an engine temperature of 160° F., oil pressure at 45 pounds and with 10 gallons of gasoline in the tank, as indicated in Fig. 2, all the slots will show the indicated readings upon green backgrounds making the whole indicated conditions appear as a solid band of green on the instrument panel. However, if one function of the car should become abnormal, the slot where that indicating reading is shown will appear red, yellow-red or yellow, as the case may be. This break in the solid green band will be readily detected at a glance by the driver who can then reduce his speed or stop the vehicle to investigate the source of the trouble.

The device may also be used to warn the driver of a new automobile when he has reached or exceeds the maximum speed specified by the manufacturer for breaking in a new machine and thereby enable the driver to reduce his speed in time to prevent serious injury to the rotative parts of the machine.

The foregoing description is directed solely towards the construction illustrated, but I desire it to be understood that I reserve the privilege of resorting to all the mechanical changes to which the device is susceptible.

I claim:

In a device of the class described including a plurality of indicating mechanisms for indicating the condition of operation of a motor vehicle and responsive to change thereof, each mechanism being provided with a rotatable drum for an indicating scale, said drums being located in close proximity, an elongated panel member in front of said drums provided with a plurality of slots of equal width therethrough with each slot exposing one of said drums, said slots extending longitudinally of the panel in alignment to form a single horizontal row, each slot being longer than the distance between said slots, the terminal ends of the adjacent slots being located in close proximity to each other so as to approximate a single relatively long continuous slotted opening in the panel, and a plurality of indicator-bearing scales one on each of said drums behind said panel, each of said scales having a plurality of color areas and being independently revoluble past its associated slot, the color areas being alike for the portions of said scale indicating normal operation, whereby color areas of the same color on said scales will be exposed to view through said slots when all the said scales are moved into indicating positions corresponding to a normal reading to indicate a normal condition of operation of the vehicle and said scales presenting a visual indication in the form of a disconnected color band in which the break in the apparent continuity of a desired color is effected by interposition in said band of a different color when at least one of said scales indicates a condition differing from a normal condition of operation of the vehicle.

CARLTON C. DRUMMOND.